(12) United States Patent
Kim et al.

(10) Patent No.: US 10,044,845 B2
(45) Date of Patent: Aug. 7, 2018

(54) ELECTRONIC DEVICE AND SYSTEM INCLUDING THE SAME

(71) Applicant: LG Electronics Inc., Seoul (KR)

(72) Inventors: Sungjae Kim, Seoul (KR); Jeongsoo Park, Seoul (KR); Seongyong Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/820,772

(22) Filed: Aug. 7, 2015

(65) Prior Publication Data

US 2016/0072936 A1 Mar. 10, 2016

(30) Foreign Application Priority Data

Sep. 5, 2014 (KR) .................. 10-2014-0119184

(51) Int. Cl.
*H04M 1/00* (2006.01)
*H04M 1/60* (2006.01)
*H04M 1/05* (2006.01)
*H04R 1/10* (2006.01)
*H04B 1/3827* (2015.01)
*H04M 1/02* (2006.01)

(52) U.S. Cl.
CPC .......... *H04M 1/6058* (2013.01); *H04B 1/385* (2013.01); *H04M 1/05* (2013.01); *H04M 1/6066* (2013.01); *H04R 1/105* (2013.01); *H04R 1/1008* (2013.01); *H04B 2001/3866* (2013.01); *H04M 1/0225* (2013.01); *H04R 1/1041* (2013.01); *H04R 1/1066* (2013.01); *H04R 1/1083* (2013.01); *H04R 2410/05* (2013.01); *H04R 2420/07* (2013.01); *H04R 2420/09* (2013.01); *H04R 2460/01* (2013.01); *H04R 2460/07* (2013.01)

(58) Field of Classification Search
CPC ............. H04M 1/6066; H04M 1/6016; H04M 1/7253; H04M 1/72558; H04M 1/72583; H04M 1/72519
USPC .......................................................... 455/570
See application file for complete search history.

(56) References Cited

U.S. PATENT DOCUMENTS

| D237,090 | S | * | 10/1975 | Yanagawa | 381/370 |
| 4,020,297 | A | * | 4/1977 | Brodie | H04M 1/05 379/430 |
| 5,677,964 | A | | 10/1997 | Sun | |
| 6,580,800 | B1 | | 6/2003 | Yamasaki et al. | |

(Continued)

FOREIGN PATENT DOCUMENTS

WO 03075607 A1 9/2003

*Primary Examiner* — Ajibola Akinyemi
(74) *Attorney, Agent, or Firm* — Dentons US LLP

(57) ABSTRACT

An electronic device and a system including the same are disclosed. An electronic device of the present invention includes: a body; a plurality of supports each of which is coupled to the body through one side thereof; and a holder configured to connect other sides of the plurality of supports having a curved portion corresponding to the shape of the ear of a user and fitted in the ear of the user, wherein at least one of the plurality of supports rotates on the body, wherein the radius of the holder is changed according to rotation of the at least one of the plurality of supports. According to the present invention, the supports coupled to the body rotate to be fixed to the user's ear.

13 Claims, 30 Drawing Sheets

(56) References Cited

U.S. PATENT DOCUMENTS

| | | | | |
|---|---|---|---|---|
| 7,110,799 B1* | 9/2006 | Willins | ............... | H04M 1/6066 379/430 |
| 2004/0041929 A1* | 3/2004 | Lapalme | ................. | B21F 1/002 348/275 |
| 2007/0286409 A1* | 12/2007 | Liu | ......................... | H04M 1/05 379/430 |
| 2010/0296683 A1* | 11/2010 | Slippy | .................. | H04R 5/0335 381/377 |
| 2013/0195307 A1* | 8/2013 | Mizuno | ................ | H04R 1/1091 381/374 |
| 2014/0341389 A1* | 11/2014 | Pavlov | ................. | H04R 1/1075 381/74 |

* cited by examiner

| 2-Mode | 1-Mode |
|--------|--------|
| Stereo | Mono   |

(b)

| Main    | Sub |
|---------|-----|
| Antenna | –   |

FIG. 20

| Button | Function |
|--------|----------|
| B1 | Volume Up |
| B2 | Volume Down |
| B3 | Power |
| B4 | Play/Pause |
| B5 | Recording |
| B6 | FF |
| B7 | Back |

FIG. 21
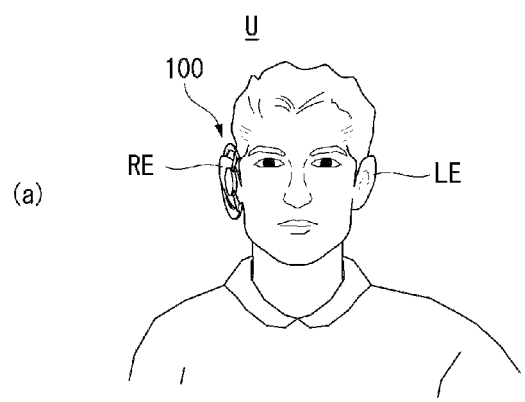
(a)
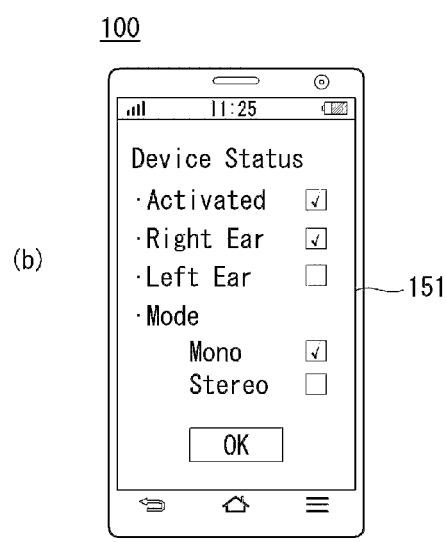
(b)

|  |  | Mode1 | Mode2 |
|---|---|---|---|
| Main MIC |  | Mic 2 | Mic 1 |
| Sub MIC |  | Mic 1 | Mic 2 |
| Button | B1 | Volume Up | Recording |
|  | B2 | Volume Down | Play/Pause |
|  | B4 | Play/Pause | Volume Down |
|  | B5 | Recording | Volume Up |
|  | B6 | FF | FF |
|  | B7 | Back | Back |

FIG. 26
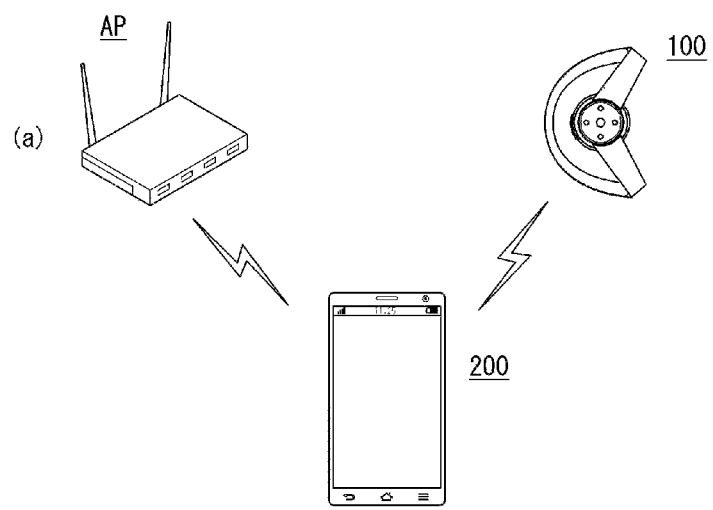
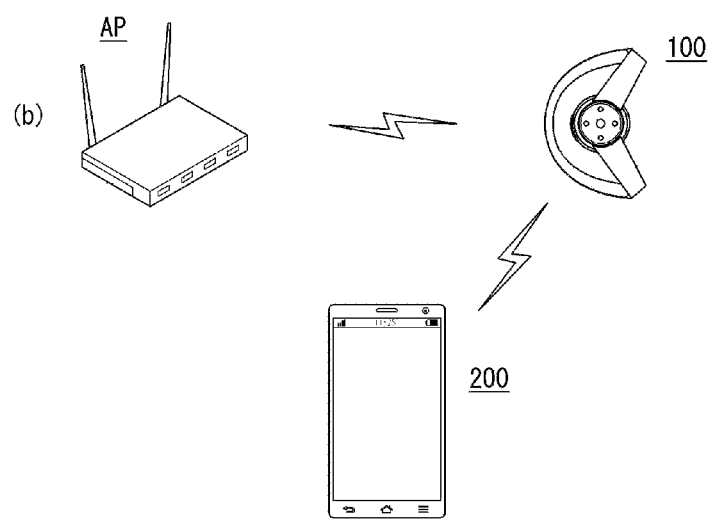

ELECTRONIC DEVICE AND SYSTEM INCLUDING THE SAME

CROSS-REFERENCE TO RELATED APPLICATIONS

Pursuant to 35 U.S.C. § 119(a), this application claims the benefit of earlier filing date and right of priority to Korean Patent Application No. 10-2014-0119184, filed on Sep. 5, 2014, the contents of which are incorporated by reference herein in their entirety.

BACKGROUND OF THE INVENTION

Technical Field

The present invention relates to an electronic device and a system including the same, more specifically, to an electronic device configured in such a manner that supports coupled to a body rotate to be fixed to the ear of a user and a system including the same.

Discussion of the Related Art

As functions of terminals such as personal computers, laptop computers and cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

Recently, an electronic device in the form of a wearable device that a user can wear has been studied.

SUMMARY OF THE INVENTION

The present invention relates to an electronic device and a system including the same and, more specifically, to an electronic device configured in such a manner that supports coupled to a body rotate to be fixed to the ear of a user and a system including the same.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 17 and 18 illustrate an electronic device according to another embodiment of the present invention.

FIGS. 19 and 20 illustrate an electronic device according to another embodiment of the present invention.

FIGS. 21 and 22 illustrate an electronic device according to another embodiment of the present invention.

FIGS. 26 to 30 illustrate an electronic device according to another embodiment of the present invention.

DETAILED DESCRIPTION

Figure 1:
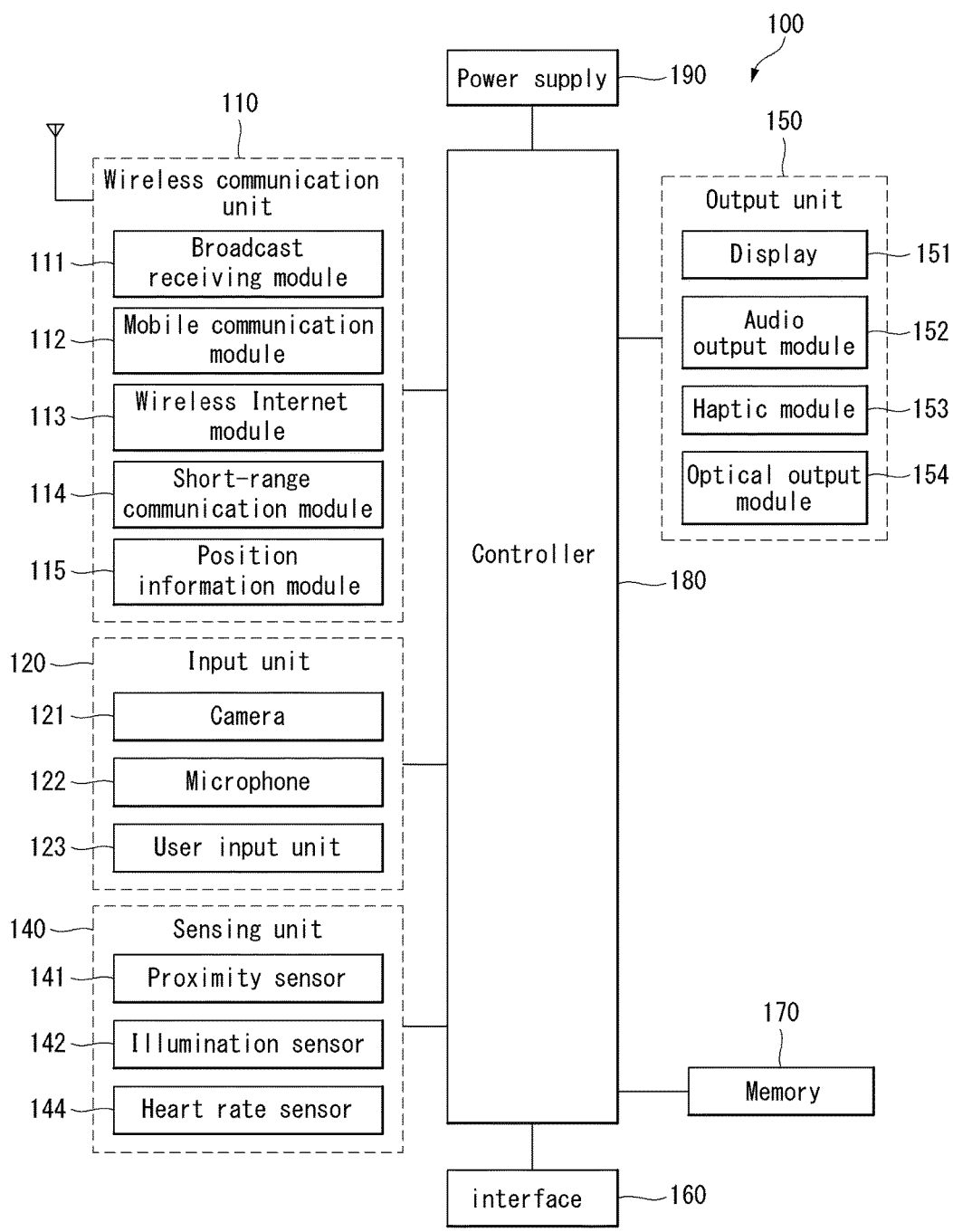
FIG. 1 is a block diagram of an electronic device related to the present invention.

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

FIG. 1A is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190.

The components shown in FIG. 1A may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems.

The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk.

The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

The sensing unit 140 may further include a heart rate sensor 144. That is, the sensing unit 140 may include a sensor capable of obtaining biometric information of a user who is wearing the electronic device 100. The electronic device 100 may be a wearable device directly coming into contact with the body of the user. Accordingly, the heart rate sensor 144 can directly come into contact with the body of the user so as to measure the heart rate of the user who is wearing the electronic device 100.

Figure 2:
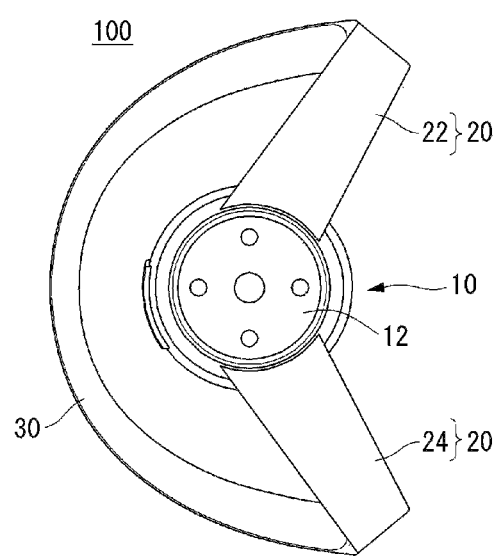
FIG. 2 is a side view of the electronic device shown in FIG. 1.

FIG. 2 is a side view of the electronic device shown in FIG. 1.

As shown, the electronic device 100 according to an embodiment of the present invention can be fitted in an ear of the user to be used. The electronic device 100 according to an embodiment of the present invention may be optimized for the shape of the ear of the user. The electronic device 100 according to an embodiment of the present invention may include a body 10, a plurality of supports 20 coupled with the body 10 and a curved holder 30 that connects other sides of the supports 20.

The body 10 may be a part that forms the center of the electronic device 100. One side of the body 10 may be closely attached to an ear of the user. A speaker may be embedded in the body 10. Accordingly, when the body is closely attached to the user's ear, a sound generated from the speaker can be effectively delivered to the user. The body 10 may be combined with a knob 12. The user can operate the electronic device 100 by turning or pressing the knob 12.

The supports 20 may be coupled to the body 10. For example, one side of each of first and second supports 22 and 24 can be coupled with the body 10 such that the first and second supports 22 and 24 are radially extended from the body 10. The supports 20 may be formed of a material having rigidity. That is, the supports 20 may be made of a plastic material that is not deformed by external force. Accordingly, even when the user applies force to the supports 20, the supports 20 can deliver the force to the holder 30 without being deformed, which will be described later in detail.

At least one of the first and second supports 22 and 24 can rotate around the body 10. For example, the second support 24 can rotate on the body 10.

The holder 30 can connect the outer sides of the first and second supports 22 and 24. For example, the holder 30 can be an arc that connects the outer sides of the first and second supports 22 and 24. The shape of the holder 30 can correspond to the structure of the user's ear. For example, the arc-shaped holder can correspond to the shape of the auricle.

The radius of the holder 30 can be changed in response to rotation of the supports 20. For example, the radius of the holder 30 can be decreased when the supports 20 are rotated rather than being at an initial position. When the radius of the holder 30 is reduced, the electronic device 100 can be fixed to the user's ear.

The holder 30 can be formed of a relatively flexible material. For example, the holder 30 can be made of a material that is more easily deformed than the material of the supports 20, such as rubber. Accordingly, when force applied to the supports 20 is delivered to the holder 30, the holder 30 can be deformed to correspond to the shape of the ear coming into contact with the holder.

Figure 3:
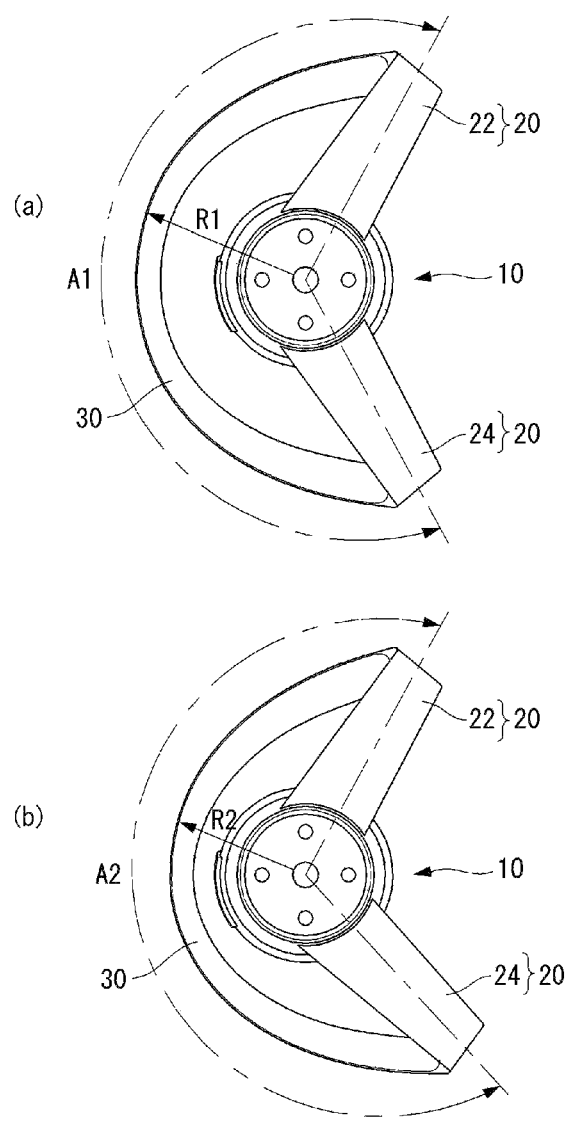
FIG. 3 illustrates operation of the electronic device shown in FIG. 2.

FIG. 3 illustrates operation of the electronic device shown in FIG. 2.

As shown, the electronic device 100 according to an embodiment of the present invention can be configured such that the shape of the holder 30 is changed according to change of the positions of the supports 20.

As shown in FIG. 3(a), the electronic device 100 may be in a first state. In the first state, the first support 22 and the second support 24 may be disposed at an angle A1.

In the first state, the distance between the center of the body 10 and the holder 30 may be R1. The distance R1 may be greater than the radius of a normal user's auricle. Accordingly, when the electronic device 100 is in the first state, the user can wear the electronic device 100 while being less affected by a structure such as the holder 30.

As shown in FIG. 3(b), the electronic device 100 may be in a second state. The second state may be a state in which the second support 24 has been rotated in a direction R. In the second state, the first support 22 and the second support 24 may be positioned at an angle A2. The angle A2 may be larger than the angle A1. In other words, the distance between the first supports 22 and the second support 24 is reduced in the second state.

In the second state, the distance between the center of the body 10 and the holder 30 may be R2. The distance R2 may be less than the normal user's auricle. Accordingly, when the electronic device 100 is in the second state, the electronic device 100 can be attached to the user's ear.

Figure 4:
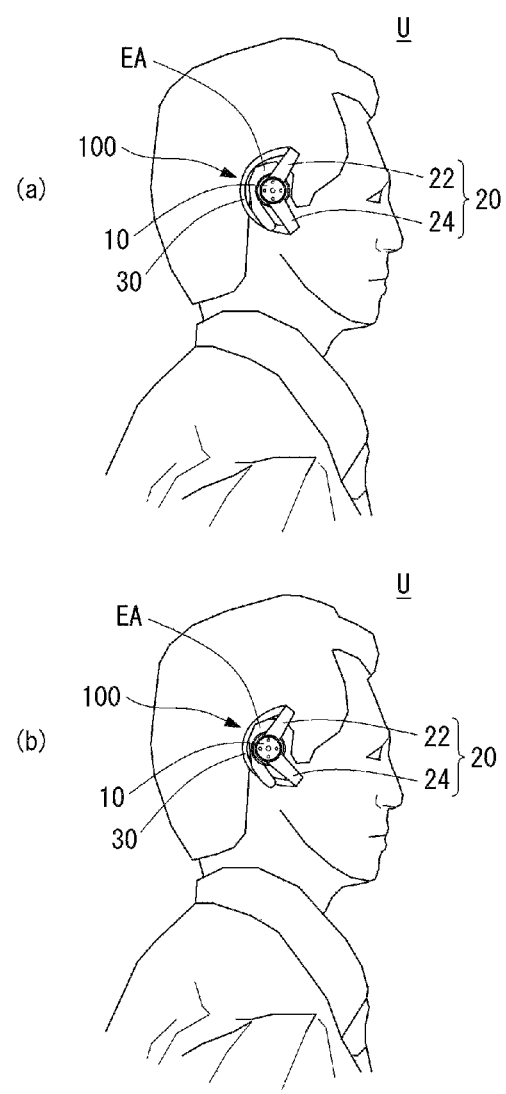
FIG. 4 illustrates states in which a user wears the electronic device shown in FIG. 2.

FIG. 4 shows a state in which the user wears the electronic device shown in FIG. 2.

As shown, the electronic device 100 according to an embodiment can be combined with the user's ear EA.

Referring to FIG. 4(a), the electronic device 100 may be in the first state in which the distance between the first and second supports 22 and 24 is long. In the first state, the electronic device 100 may hang on the user's ear EA. That is, the electronic device 100 may not be closely attached to the user's ear in the first state.

Referring to FIG. 4(b), the electronic device 100 may be in the second state in which the distance between the first and second supports 22 and 24 is reduced. In the second state, the electronic device 100 may be fixed to the user's ear EA. That is, the distance between the first and second supports 22 and 24 is changed so as to allow the holder 30 to be tightened, and thus the electronic device 100 can be naturally attached to the user's ear EA.

When the electronic device 100 is combined with the user's ear EA in the second state, the user need not perform an additional operation such as holding the electronic device 100. Accordingly, the user can use the electronic device 100 more conveniently.

Figure 5:
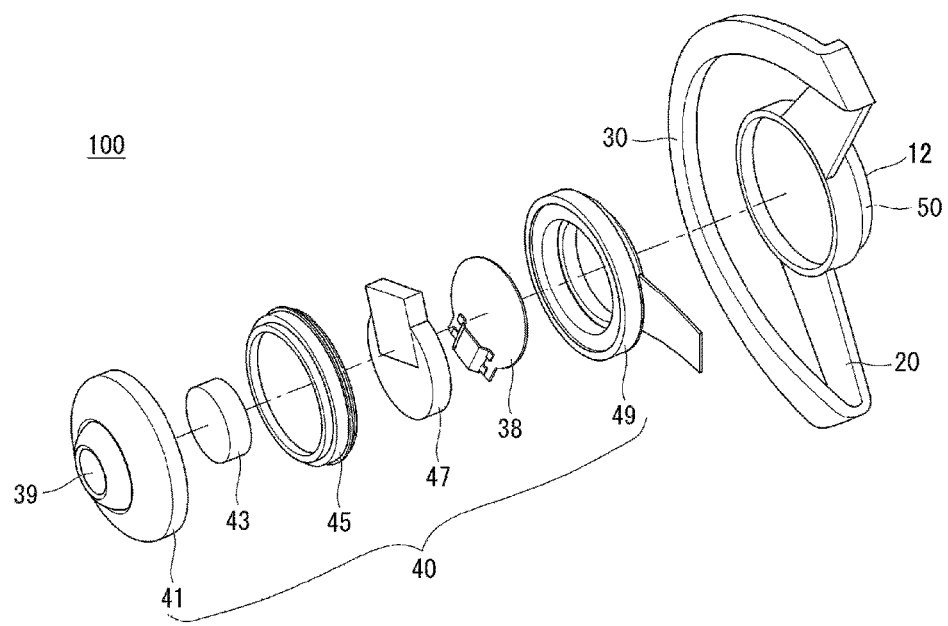
FIGS. 5, 6 and 7 are exploded perspective views of the electronic device shown in FIG. 2.
Figure 6:
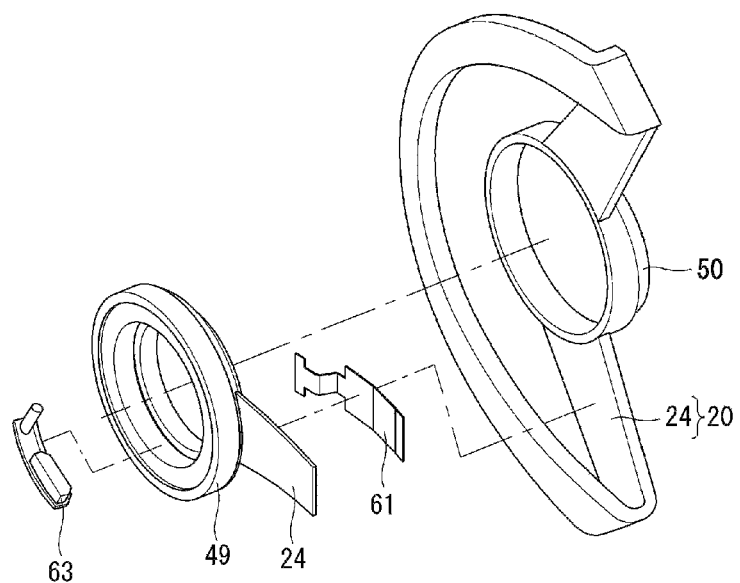
Figure 7:
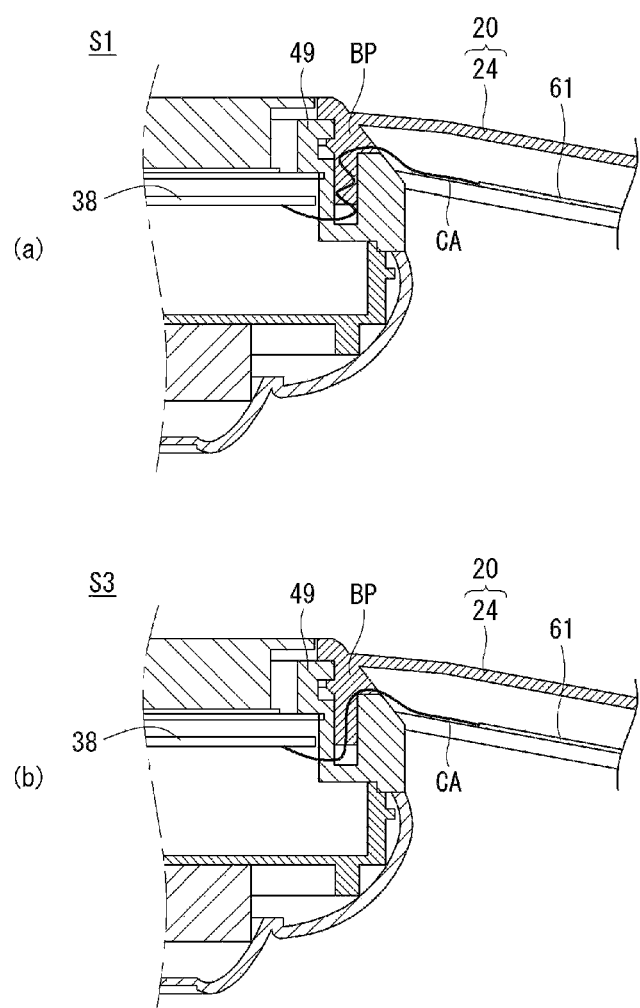

FIGS. 5, 6 and 7 are exploded perspective views of the electronic device shown in FIG. 2.

As shown, the electronic device 100 according to an embodiment of the present invention may include a cover assembly 40 and an assembly setting part 50.

Referring to FIG. 5, the cover assembly 40 may include an ear cap 41, a speaker 43, a front cover 45, a battery 47 and a frame 49.

The ear cap 41 can come into contact with the inner side of the auricle of the user. The center 39 of the ear cap 41 can be positioned to correspond to the ear canal of the user's ear. Accordingly, a sound generated in the speaker 43 inside of the ear cap 41 can be delivered to the user through the center 39.

The battery 47 can supply power necessary for operation of the electronic device 100. The battery 47 can be spatially separated from the ear cap 41 by the front cover 45.

The frame 49 forms the exterior of the cover assembly 40 with the ear cap 41. A PCB 38 can be fitted into the inside of the frame 49.

The PCB 38 may have various electronic components for operation of the electronic device 100. For example, the PCB 38 can have an acceleration sensor provided thereto. In addition, the PCB 38 may have an interface for charging and/or communication.

The cover assembly 40 can be combined with the assembly setting part 50.

The assembly setting part 50 may be coupled with the supports 20. If only one of the supports 20 can be rotated, the rotatable support 20 may be coupled with the assembly setting part 50.

FIG. 6 shows components around the frame 49 in more detail.

As shown, an antenna 61 and a cap 63 may be combined with the frame 49.

The antenna 61 may be an antenna for the wireless communication unit (110 of FIG. 1). The antenna 61 may be configured in the form of an FPCB. For example, a flexible antenna 61 corresponding to the shape of the second support and an extended part 62 of the frame 49, which corresponds to the shape of the second support 24, can be provided. Since the antenna 61 is separated from the PCB (38 of FIG. 5) disposed inside of the frame 49 and positioned along the extended part 62, improvement of transmission and reception performance of the antenna 61 can be expected.

The cap 63 can be selectively fitted into one side of the frame 49. For example, the cap 63 can block a USB port and/or a charging port provided to the PCB (38 of FIG. 5). The cap 63 can be made of a flexible material such as rubber.

FIG. 7 illustrates connection of the antenna 61 and the PCB 38.

As described above, the antenna 61 can be positioned in the supports 20. The supports 20 can rotate on the frame 49. When the supports 20 rotate on the frame 49, the distance between the PCB 38 and the antenna 61 can be changed. That is, the distance between the PCB 38 fixed to the inside of the frame 49 and the antenna 61 positioned in the rotating supports 20 can be changed. The distance between the PCB 38 and an electronic component disposed in the rotating supports 20 can also be changed.

A cable CA can couple the antenna 61 and the PCB 38. The cable CA may include a buffer part BP. That is, a part for buffering distance change between the antenna 61 and the PCB 38 can be provided.

FIG. 7(a) shows a case in which the second support is in the first state S1. For example, the distance between the first and second supports 22 and 24 has been increased. In this state, the cable CA can be present loosely in the buffer part BP. That is, a cable CA longer than the buffer part BP can be accommodated in the buffer part BP.

FIG. 7(b) shows a case in which the second support 24 is in a third state S3. For example, the first and second supports 22 and 24 can be close to each other. In this state, a shorter cable CA can be accommodated in the buffer part BP than in the first state S1. That is, a cable CA having substantially the same length as the buffer part BP can be accommodated in the buffer part BP.

Since the length of the cable CA accommodated in the buffer part BP is changed, the antenna 61 and the PCB 38 can be stably coupled even when the supports 20 rotate.

Figure 8:
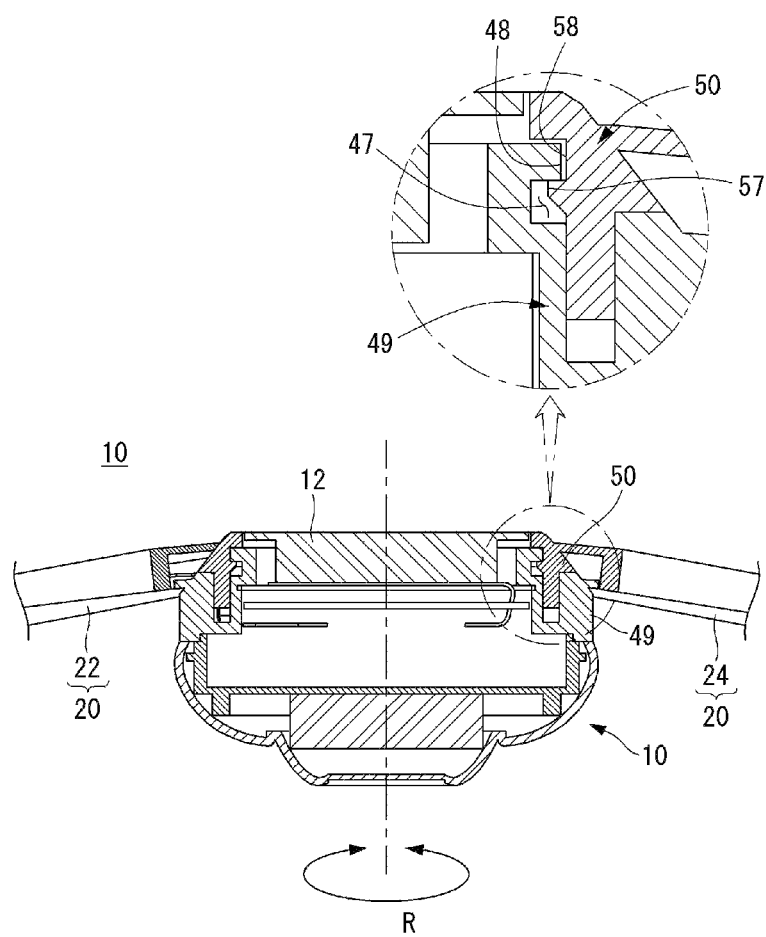
FIG. 8 is a cross-sectional view of the body of the electronic device shown in FIG. 2.

FIG. 8 is a cross-sectional view of the body of the electronic device shown in FIG. 2.

As shown, in the electronic device 100 according to an embodiment of the present invention, the frame 49 and the assembly setting part 50 may be rotatably combined. The frame 49 and the assembly setting part 50 may be coupled such that they are not separated from each other during rotation.

The rotatable supports 20 may be coupled to the assembly setting part 50, as described above. For example, the second support 24 can be coupled to the assembly setting part 50.

A first groove 58 and a first boss 57 may be provided to the inner circumferential surface of the assembly setting part 50. The first groove 58 and the first boss 57 may be consecutively provided along the inner circumferential surface of the assembly setting part 50.

A second boss 48 and a second groove 47 may be provided to the outer circumferential surface of the frame 49. The second boss 48 and the second groove 47 may be consecutively provided along the outer circumferential surface of the frame 49.

The first groove 58 and the second boss 48 may have positions and shapes corresponding to each other. The second groove 47 and the first boss 57 may have positions and shapes corresponding to each other. The assembly setting part 50 is not separated from the frame 49 during rotation of the supports 20 in the direction R owing to the corresponding shapes of the first groove 58 and the second boss 48 and/or the corresponding shapes of the second groove 47 and the first boss 57.

Figure 9:
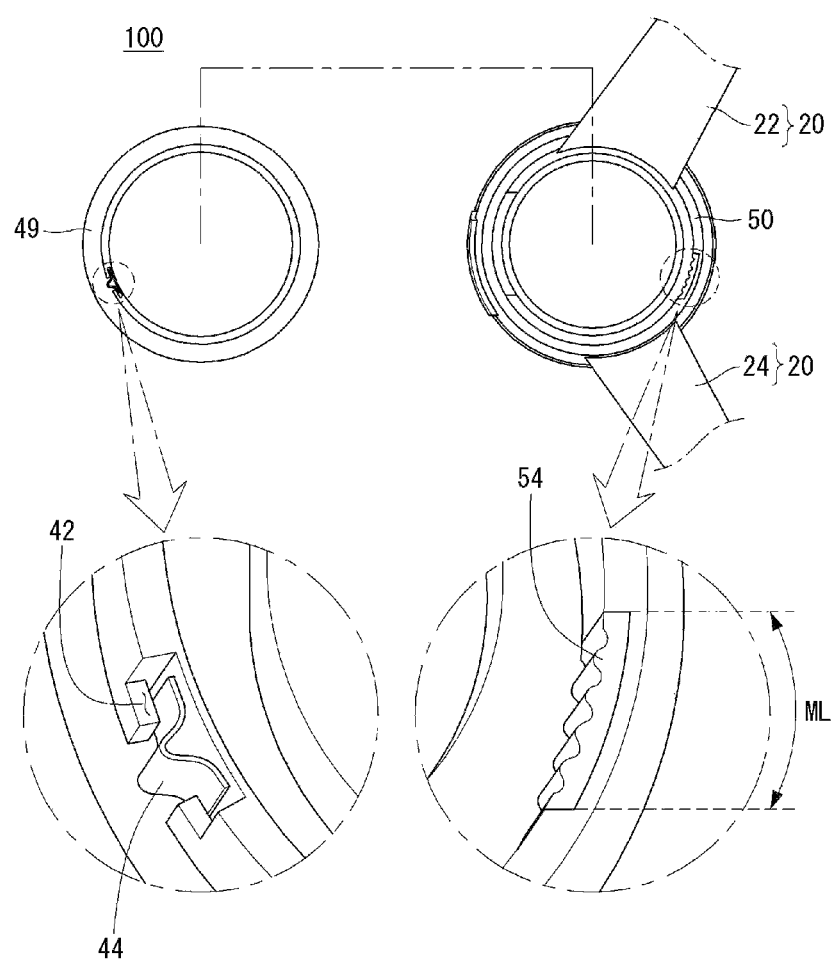
FIGS. 9 and 10 are partial exploded views of the electronic device shown in FIG. 2.
Figure 10:
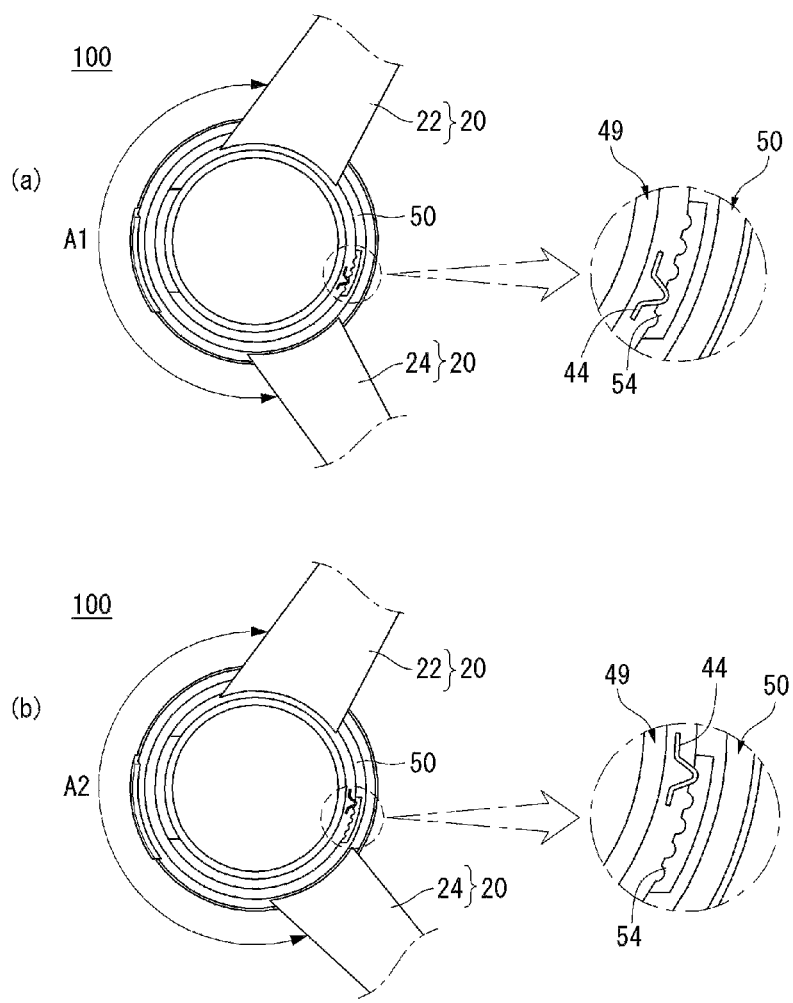

FIGS. 9 and 10 are partial exploded views of the electronic device shown in FIG. 2.

As shown, the electronic device 100 according to an embodiment of the present invention may include a stopper for fixing the rotated supports 20 to a specific position.

As shown in FIG. 9, a pattern 54 may be formed at the assembly setting part 50. For example, a corrugated pattern 54 can be formed in a region corresponding to a movement distance ML of the second support 24 along the inner side of the assembly setting part 50.

The pattern 54 may have a wavy shape. For example, the pattern 54 can have a form in which a ridge and a valley are repeated.

The pattern 54 may be formed of a material different from the other region of the assembly setting part 50. For example, the pattern 54 can be formed of polyacetal having high fatigue resistance and a low wear/friction coefficient.

The frame 49 may have an elastic spring 44 provided to a receiving part 42.

The elastic spring 44 is of a plate type and may correspond to the shape of the pattern 54.

The elastic spring 44 and the pattern 54 come into contact with each other and can function as a stopper. That is, the elastic spring 44 and the pattern 54 can fix the rotated supports 40.

As shown in FIG. 10(a), the first and second supports 22 and 24 may be disposed at the angle A1. The elastic spring 44 may be positioned in the first valley of the pattern 54. The user may apply force in the direction R1. When the force in the direction R1 exceeds elastic force of the elastic spring 44, the elastic spring 44 can be deformed so as to move to the next valley.

As shown in FIG. 10(b), the elastic spring 44 can be moved to the last valley of the pattern 54 according to the force applied by the user. The second support 24 is rotated according to movement of the elastic spring 44 and thus the first and second supports 22 and 24 can be disposed at the angle A2. When the force applied by the user is removed, the elastic spring 44 can be fixed to the valley at which the elastic spring 44 is stopped according to the elastic force thereof. Accordingly, the second support 24 can also be fixed to the corresponding position.

Figure 11:
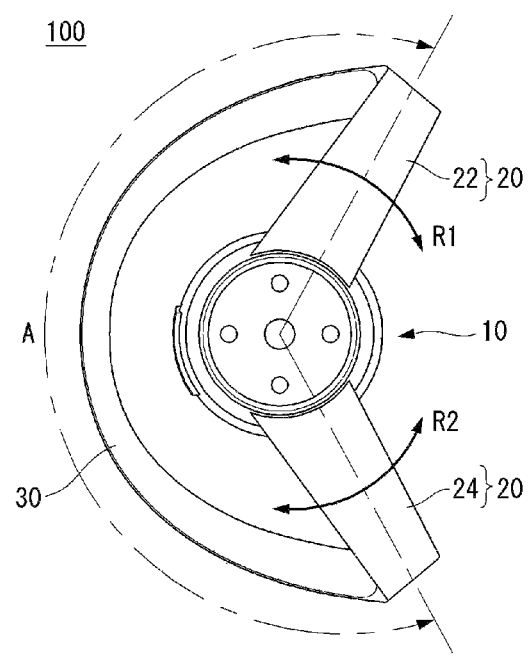
FIGS. 11 and 12 illustrate an electronic device according to another embodiment of the present invention.
Figure 12:
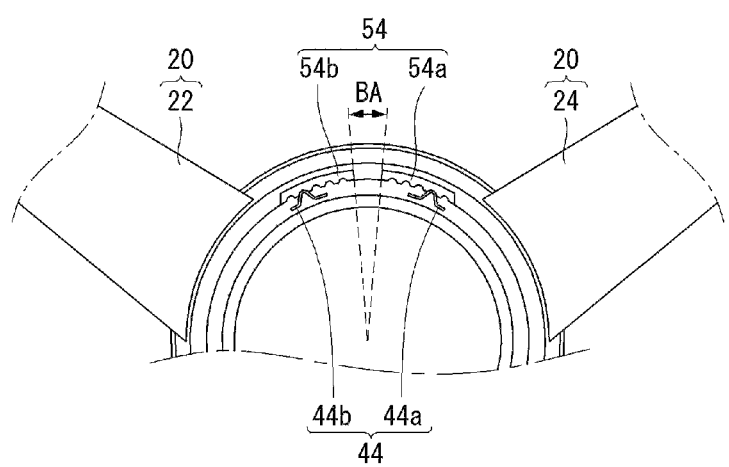

FIGS. 11 and 12 illustrate an electronic device according to another embodiment of the present invention.

As shown, in the electronic device 100 according to another embodiment of the present invention, both the first and second supports 22 and 24 can be rotated. Accordingly, the angle between the first and second supports 22 and 24 can be changed in a wider range.

Referring to FIG. 11, the first support 22 can be rotated in the direction R1 and the second support 24 can be rotated in the direction R2. Since both the first and second supports 22 and 24 are moved, a variation in the angle A between the first and second supports 22 and 24 can increase.

Figure 22:
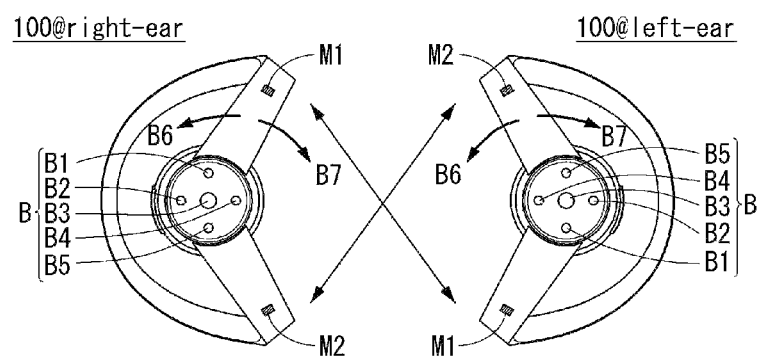

Referring to FIG. 22, a pattern 54 and an elastic spring 44 corresponding to the first and second supports 22 and 24 may be present. For example, first and second patterns 54a and 54b and first and second elastic springs 44a and 44b can be provided.

A buffer area BA may be provided between the first and second patterns 54a and 54b. That is, an area in which the pattern 54 is not present may be provided between the first and second patterns 54a and 54b. The rotating first and second supports 22 and 24 may not interfere with each other owing to presence of the buffer area BA. The width of the buffer area BA may be equal to or greater than the thickness of the supports 20.

FIGS. 13 to 16 illustrate an electronic device according to another embodiment of the present invention.

As shown, the electronic device 100 according to another embodiment of the present invention can execute a function corresponding to distance change between the supports 20.

Figure 13:
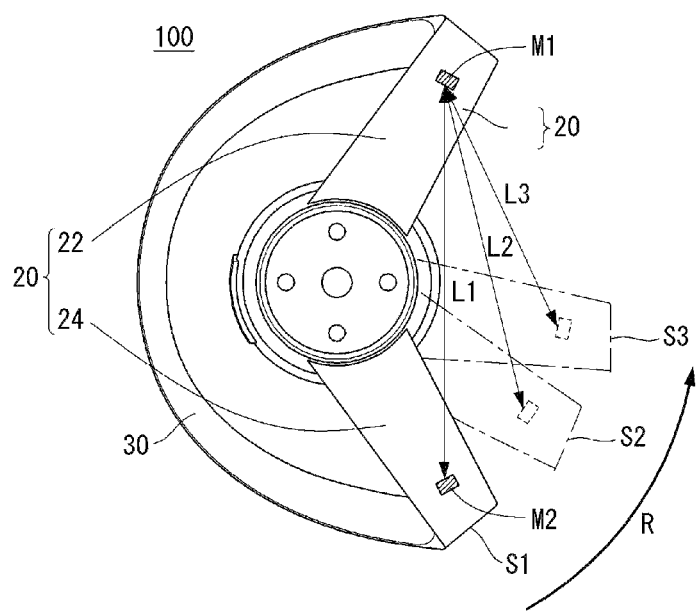
FIGS. 13 to 16 illustrate an electronic device according to another embodiment of the present invention.

As shown in FIG. 13, microphones M1 and M2 may be positioned in the supports 20. For example, the first microphone M1 can be positioned in the first support 22 and the second microphone M2 can be positioned in the second support 24.

The first and second microphones M1 and M2 may be respectively positioned at the ends of the first and second supports 22 and 24. Since the first and second microphones M1 and M2 are positioned at the ends of the first and second supports 22 and 24, a user's voice can be effectively acquired not only when the user wears the electronic device 100 on the right ear but also when the user wears the electronic device 100 on the left ear. That is, one of the first and second microphones M1 and M2 can be positioned close to the mouth of the user when the user wears the electronic device 100.

The first and second microphones M1 and M2 can be used for noise cancelling. For example, when the second microphone M2 is close to the mouth of the user, a sound sensed by the second microphone M2 can be regarded as a normal sound and a sound sensed by the first microphone M1 can be regarded as noise. Accordingly, the controller can cancel noise by applying a predetermined gain value to the sounds sensed by the first and second microphones M1 and M2.

The applied gain value may be a predetermined value. However, since the second support 24 can be rotated in the direction R2 in the electronic device 100 according to an embodiment of the present invention, the distance between the first and second microphones M1 and M2 can be changed to L1, L2 and L3. That is, the distance between the first and second microphones M1 and M2 can be changed to L1, L2 and L3 as the second support 24 is switched to the first, second and third states S1, S2 and S3.

When the distance between the first and second microphones M1 and M2 has been changed, the gain value needs to be changed. That is, the gain value, which is a control signal, needs to be changed depending on the distance for optimization of noise cancelling.

Figure 14:
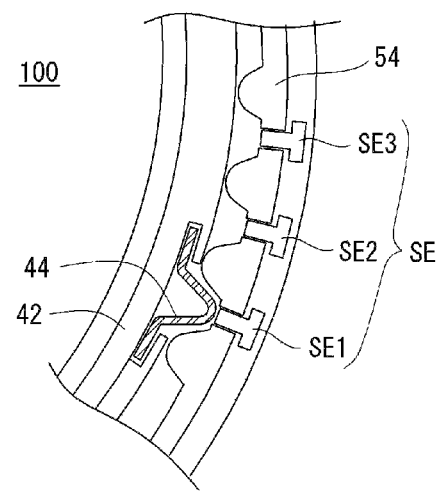

Referring to FIG. 14, the state of the second support 24 can be sensed by position sensors SE. The position sensors SE may be first, second and third sensors SE1, SE2 and SE3 respectively provided to valleys of the pattern 54.

Upon movement of the second support 24, the elastic spring 44 can be sequentially moved to valleys of the pattern, as described above. The elastic spring 44 positioned at a valley of the pattern 54 can touch the position sensor SE corresponding to the valley. The controller can recognize that the elastic spring 44 is located at the position corresponding to the touched position sensor SE. That is, the controller can sense that the second support 24 is located at the corresponding position and thus can detect the distance between the first and second microphones M1 and M2.

Figure 15:
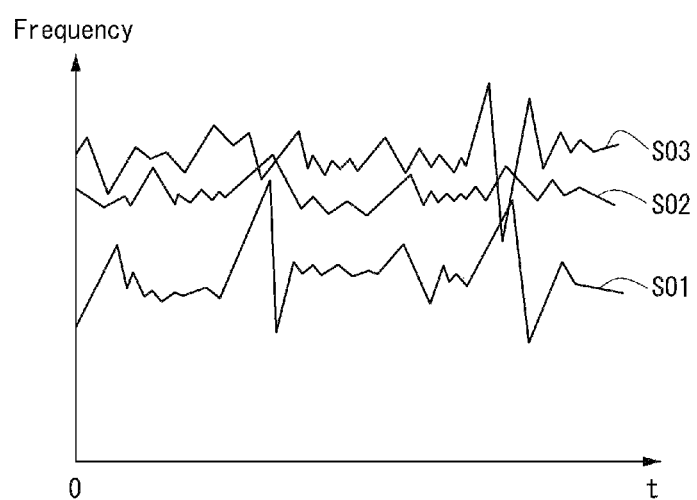

As shown in FIG. 15, sounds acquired through the microphones M1 and M2 may be present. For example, a first sound S01, acquired through the second microphone M2 close to the mouth of the user who wears the electronic device, and a second sound S02, determined as noise through the first and second microphones M1 and M2 when the second support 24 is in the corresponding state, can be present.

When the position of the second microphone is changed, a sound determined as noise can be changed. For example, the second sound, which is regarded as noise in the first state (S1 of FIG. 13), can be changed to a third sound S03 in the third state (S3 of FIG. 13). This can be clearly understood considering that noise determination is based on a difference between sounds acquired through the first and second microphones M1 and M2 and sensed sounds can be varied upon change of the distance between the first and second microphones M1 and M2.

When the sound determined as noise is changed as the distance between the first and second microphones M1 and M2 is varied, the electronic device 100 can perform control operation corresponding thereto. For example, the electronic device 100 can change a gain value applied to a noise cancellation circuit.

Figure 16:
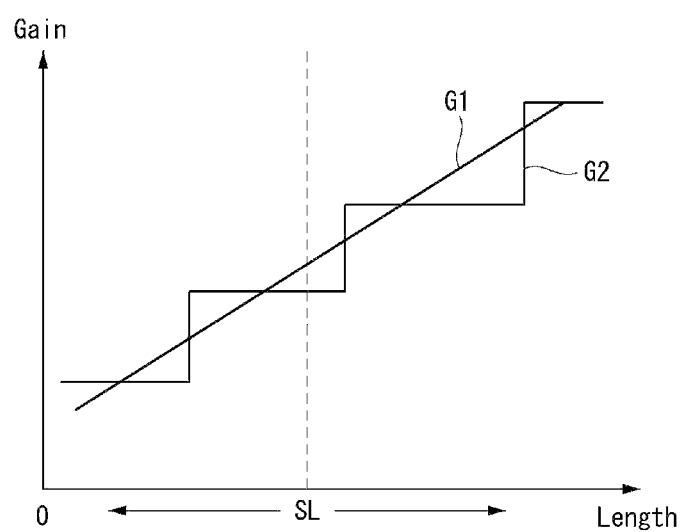

As shown in FIG. 16, the gain value applied to the noise cancellation circuit may be changed on the basis of a reference length SL. For example, the gain value can be reduced when the distance between the first and second microphones M1 and M2 is shorter than the reference length SL, whereas the gain value can be increased when the gain value can be reduced when the distance between the first and second microphones M1 and M2 is greater than the reference length SL. The gain value can be changed to a first gradient G1 which is linearly changed or a second gradient G2 which is discretely changed per predetermined section.

Figure 17:
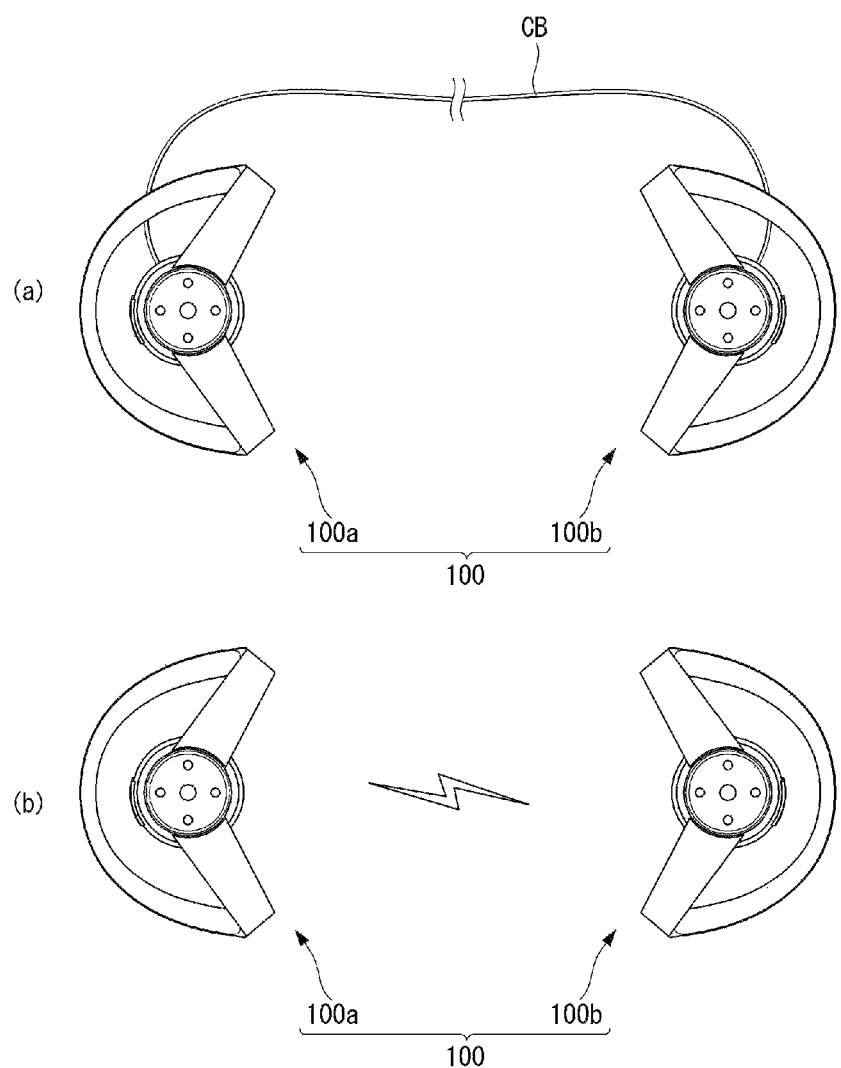

FIGS. 17 and 18 illustrate an electronic device according to another embodiment of the present invention.

As shown, the electronic device 100 according to another embodiment of the present invention can be operated in such a manner that multiple electronic devices are operated together. When the multiple electronic devices are operated together, different functions from those when one electronic device is operated can be executed.

As shown in FIG. 17(a), the electronic device 100 can include first and second electronic devices 100a and 100b. The first and second electronic devices 100a and 100b may be coupled through a cable CB. The first electronic device 100a may correspond to the left ear and the second electronic device 100b may correspond to the right ear.

As shown in FIG. 17(b), the first and second electronic devices 100a and 100b may be coupled wirelessly. That is, data can be wirelessly transmitted from the first electronic device 100a to the second electronic device 100b and/or from the second electronic device 100b to the first electronic device 100a.

Referring to FIG. 18(a), operation of the electronic device 100 can be switched between 2-mode in which two electronic devices 100 are used and 1-mode in which one electronic device 100 is used. For example, the electronic device 100 can operate in stereo in 2-mode, whereas the electronic device 100 can operate in mono in 1-mode. Sounds are output in different manners when the user wears the electronic device 100 on both ears and when the user wears the electronic device 100 on one ear, and thus the user can listen to more natural sound.

Referring to FIG. 18(b), when two electronic devices 100 are used, the first electronic device 100a can serve as a main device and the second electronic device 100b can serve as a sub-device. In this case, the first and second electronic devices 100a and 100b may have different configurations. For example, an antenna for communication with an external device can be provided to the first electronic device 100a only. That is, the second electronic device 100b can be subordinate to the first electronic device 100a.

Figure 19:
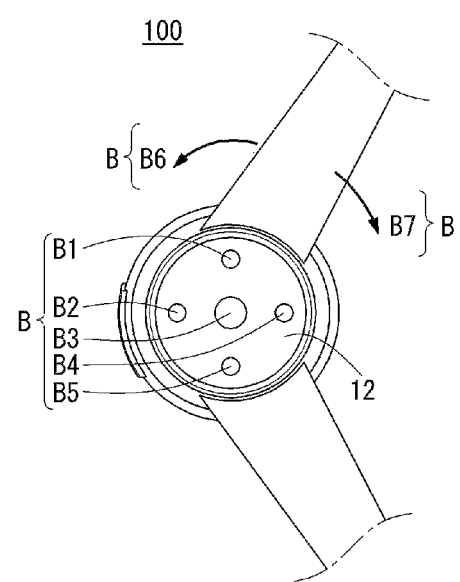

FIGS. 19 and 20 illustrate an electronic device according to another embodiment of the present invention.

As shown, the electronic device 100 according to another embodiment of the present invention can receive necessary input from the user through operation of the knob 12 and/or a button B on the knob 12.

As shown in FIG. 19, first to fifth buttons B1 to B5 may be provided on the knob 12. The first to fifth buttons B1 to B5 may be push buttons that generate electrical signals according to pressure applied by a finger of the user.

The knob 12 may be rotated clockwise and/or counterclockwise. Counterclockwise rotation can function as a sixth button B6 and clockwise rotation can function as a seventh button B7. Accordingly, it is possible to apply intuitive input using the shape of the knob 12 while reducing the number of push buttons.

As shown in FIG. 20, the first to seventh buttons B1 to B7 may be assigned respective functions.

FIGS. 21 and 22 illustrate an electronic device according to another embodiment of the present invention.

As shown, the electronic device 100 according to another embodiment of the present invention can perform different operations depending on positions to which the electronic device 100 is attached.

As shown in FIG. 21(a), the electronic device 100 may be attached to one of the left and right ears LE and RE of the user U. For example, the user can wear the electronic device 100 on the right ear RE.

As shown in FIG. 21(b), the display 151 of the mobile terminal 100 that exchanges data with the electronic device 100 may display the status of the electronic device 100.

The display 151 may display whether the user wears the electronic device 100. For example, the display 151 can display whether the electronic device 100 is put on the user's ear so as to be activated. The electronic device 100 may include a sensor capable of sensing contact between the electronic device 100 and the user's ear. For example, information representing contact of the user's ear and the electronic device 100, sensed through a button and/or a temperature sensor, which are pushed when the electronic device 100 comes into contact with the user's ear, can be transmitted to the mobile terminal 100.

The display 151 may indicate which ear wears the electronic device 100. For example, information, sensed through: the fact that a position at which the body temperature of the user is sensed depends on whether the electronic device 100 comes into contact with the left ear LE or the right ear RE; one of the first and second microphones M1 and M2, to which a user's voice is input with a higher level;

and/or a gyro sensor sensing the direction of the electronic device 100 put on the user's ear, can be transmitted to the mobile terminal 100.

The display 151 may display other states of the electronic device 100. For example, the display 151 can display a sound output mode of the electronic device 100.

As shown in FIG. 22, the electronic device 100 may perform different operations depending on whether the electronic device 100 is put on the left ear or the right ear of the user.

Referring to FIG. 22(*a*), the user can put the electronic device 100 on the right ear or the left ear. To this end, the electronic device 100 may have a symmetrical form.

When the electronic device 100 is put on the right ear, the second microphone M2 can be positioned at the bottom of the electronic device 100. Accordingly, a user's voice is input mainly through the second microphone M2 and the first microphone M1 can function as a sub-microphone for noise cancellation.

When the electronic device 100 is put on the left ear, the first microphone M1 can be positioned at the bottom of the electronic device 100. Accordingly, a user's voice is input mainly through the first microphone M1 and the second microphone M2 can serve as a sub-microphone for noise cancellation.

Referring to FIG. 22(*b*), the electronic device 100 may be in a first mode or a second mode. For example, the first mode can correspond to a state in which the electronic device 100 is put on the right ear and the second mode can correspond to a state in which the electronic device 100 is put on the left ear.

In the first mode, the second microphone can function as a main microphone and the first microphone can function as a sub-microphone. That is, the second microphone can be used to acquire a user's voice and the first microphone can be used as a source for noise removal.

In the second mode, the first microphone can function as the main microphone and the second microphone can function as the sub-microphone. Such operation is caused by the fact that the distance between the mouth of the user and the microphone is varied depending on which ear wears the electronic device 100.

Functions allocated to the first to seventh buttons B1 to B7 may be different in the first mode and in the second mode since the positions of the buttons are different when the electronic device is worn on the left ear and when the electronic device is worn on the right ear. For example, when the electronic device is put on the right ear, the first button B1 can be located at the top. When the electronic device is put on the left ear, the first button B1 can be located at the bottom.

The user may want buttons at the same position to execute the same function irrespective of whether the electronic device is put on the left ear or the right ear. Accordingly, the electronic device 100 according to an embodiment of the present invention can change the function of the first button B1, which is positioned at the top when the electronic device is put on the right ear, to be the same as the function of the fifth button B5, which is positioned at the top when the electronic device is put on the left ear. Such button function change can be equally performed for other buttons.

Figure 23:
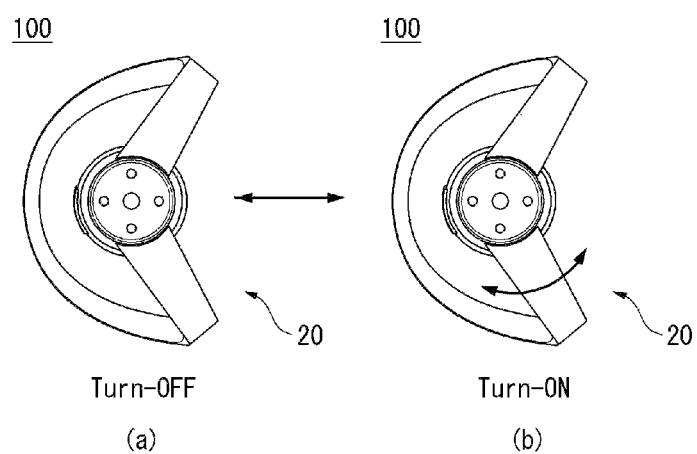
FIGS. 23, 24 and 25 illustrate an electronic device according to another embodiment of the present invention.
Figure 24:
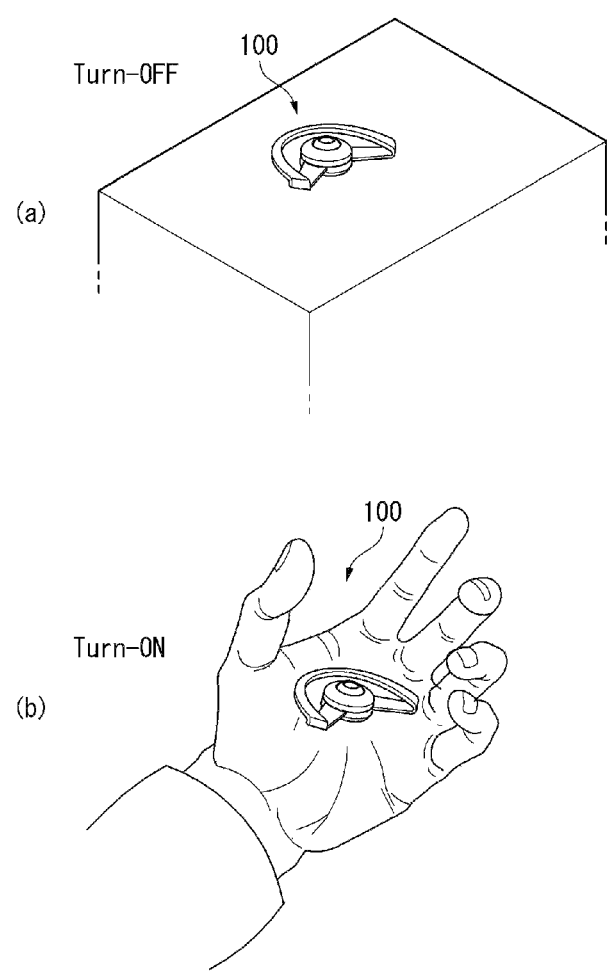
Figure 25:
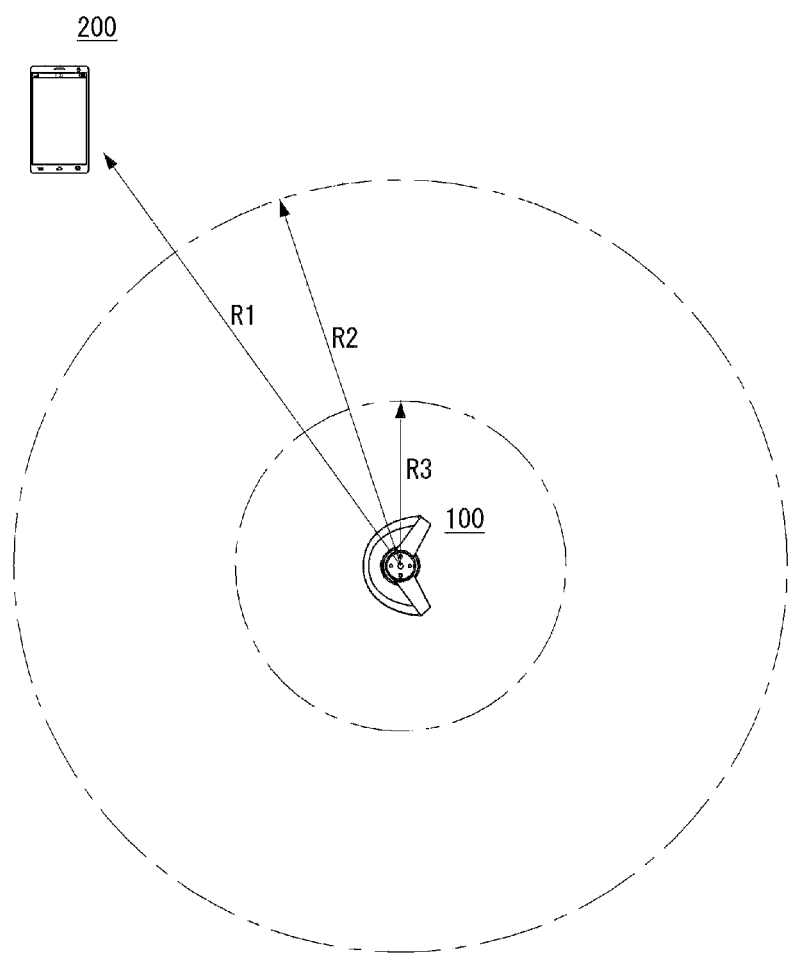

FIGS. 23, 24 and 25 illustrate an electronic device according to another embodiment of the present invention.

As shown, the electronic device 100 according to another embodiment of the present invention can perform a predetermined operation even when the user does not directly manipulate a button of the electronic device 100, thereby improving user convenience.

Referring to FIG. 23(*a*), the electronic device 100 can be automatically turned off when the user does not operate the supports 20 for a predetermined time or longer. Turn-off may correspond to a case in which the electronic device 100 is completely powered off or may include a sleep state in which only minimum functions necessary for the electronic device 100 to be re-activated are executed.

The electronic device 100 can be used by being worn on the user's ear. Further, the supports 20 are manipulated in order to put the electronic device 100 on the user's ear. Accordingly, if the user does not operate the supports 20 as the user does not wear the electronic device, it can be determined that the user has no intention to use the electronic device 100. Therefore, the controller 180 of the electronic device 100 can minimize power consumption by turning off the electronic device 100.

Referring to FIG. 23(*b*), the electronic device 100 can be automatically turned on upon generation of user manipulation applied to the supports 20. That is, when the user rotates the supports 20 in order to wear the electronic device 100, as described above, the electronic device 100 can be turned on. Since there is no need for additional operation of the user to turn on the electronic device 100, user convenience can be improved.

Referring to FIG. 24(*a*), the electronic device 100 can be automatically turned off when the electronic device 100 is placed at a specific position without being moved for a predetermined time or longer. Since the electronic device 100 is a wearable device that is used by being put on a user's ear, movement of the electronic device 100 can be sensed through the acceleration sensor if the electronic device 100 is being used. Accordingly, when movement of the electronic device 100 is not sensed for a predetermined time or longer through the acceleration sensor, the controller of the electronic device 100 can power off the electronic device 100.

Referring to FIG. 24(*b*), the electronic device 100 can be automatically turned on when movement of the electronic device 100 is sensed through the acceleration sensor. For example, upon sensing of movement of the electronic device 100 when the user holds the electronic device 100 disposed on a desk is sensed, the electronic device 100 can be turned on. When a display is provided to the outside of the electronic device 100, the display can display a specific color when the electronic device 100 is turned on and/or off so as to visually inform the user of a switched state or a current state.

Referring to FIG. 25, the electronic device 100 may have a specific relation with the mobile terminal 200. For example, the electronic device 100 and the mobile terminal 200 can be paired.

The electronic device 100 may be spaced apart from the mobile terminal 200. For example, the electronic device 100 can be at first to third distances (R1 to R3) from the mobile terminal 200. The electronic device 100 can perform different operations depending on distances between the electronic device 100 and the mobile terminal 200.

When the electronic device 100 is at the first distance R1, the electronic device 100 can be turned off.

When the electronic device 100 is at the second distance R2, the electronic device 100 can be turned on.

When the electronic device 100 is at the third distance R3, the electronic device 100 can accurately indicate the position thereof. For example, the user can be informed of the accurate position of the electronic device 100 through vibrations at predetermined intervals, sound at predetermined intervals and/or display at predetermined intervals.

FIGS. 26 to 30 illustrate operation of the electronic device according to another embodiment of the present invention.

As shown, the electronic device 100 according to another embodiment of the present invention can perform predetermined operation with the mobile terminal 200 used by the user. For example, the electronic device 100 and the mobile terminal 200 can form one system so as to transmit a control signal from one of the electronic device and the mobile terminal 200 to the other.

Referring to FIG. 26(a), the electronic device 100 can receive external data through the mobile terminal 200. For example, the mobile terminal 200 can communicate with a base station AP and the electronic device 100 can receive data from the mobile terminal 200 through Bluetooth communication and the like. The mobile terminal 200 may process data received from an external device such as the base station AP and transmit the processed data to the electronic device 100.

Referring to FIG. 26(b), the electronic device 100 may directly communicate with an external device. For example, the electronic device 100 can directly receive data from the base station AP. Upon reception of the data from the base station AP, the electronic device 100 can transmit the data to the paired mobile terminal 200.

Figure 27:
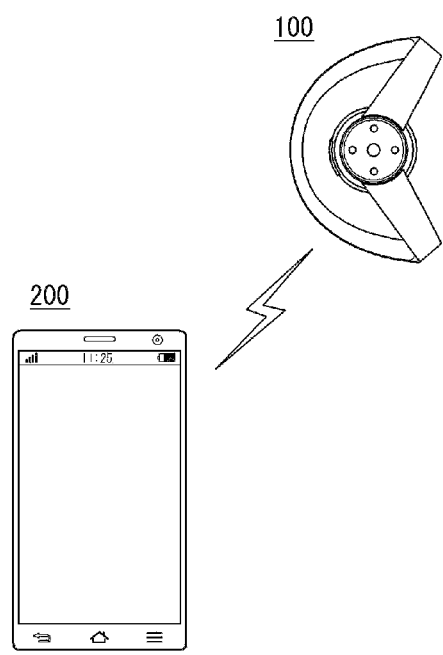

Referring to FIG. 27, the electronic device 100 may be associated with the mobile terminal 200 used by the user. Association can refer to a state in which the electronic device 100 and the mobile terminal 200 can exchange data.

Figure 28:
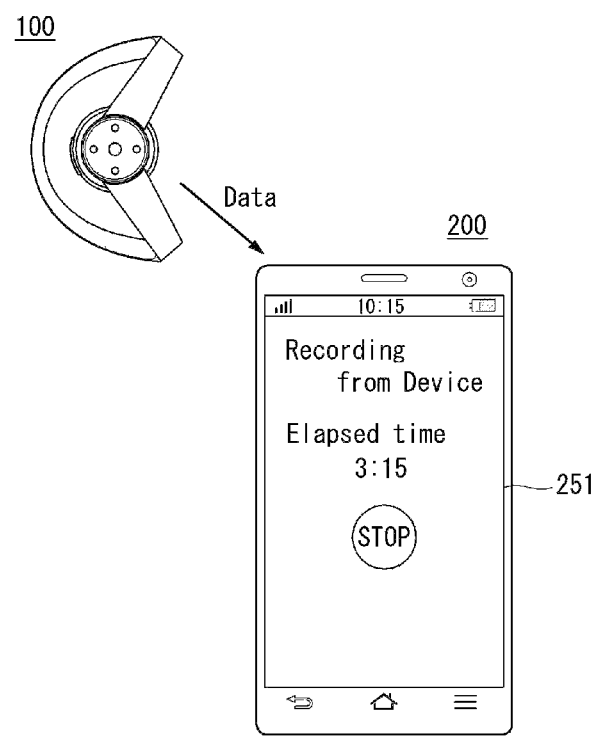

Referring to FIG. 28, the electronic device 100 can transmit data to the mobile terminal 200. For example, the user can execute a recording function using the electronic device 100. The electronic device 100 may include only a minimum memory necessary for operation of the electronic device 100 or have small memory capacity. The electronic device 100 can transmit recorded data to the mobile terminal 200. The mobile terminal 200 can store the recorded data received from the electronic device 100. The mobile terminal 200 can display storage status of the recorded data received from the electronic device 100.

The electronic device 100 can transmit various types of data. For example, the electronic device 100 can transmit biometric signal data of the user, acquired through the heart rate sensor, and motion data acquired through the acceleration sensor to the mobile terminal 200. The electronic device 100 may have lower data processing capability than the mobile terminal 200. Accordingly, the electronic device 100 can transmit raw data to the mobile terminal 200 and the mobile terminal 200 can process the received raw data and inform the user of the processed data.

Figure 29:
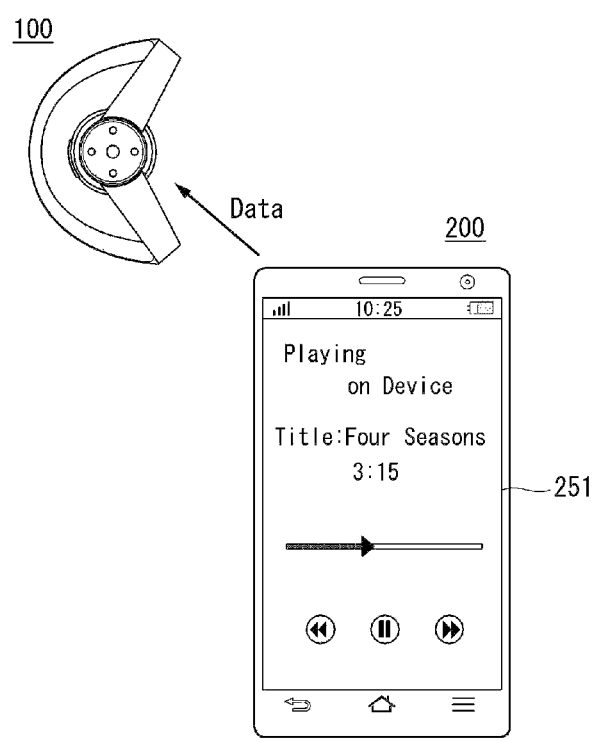

Referring to FIG. 29, the mobile terminal 200 can transmit data to the electronic device 100. For example, the mobile terminal 200 can transmit sound data that can be output from the electronic device 100 using a Bluetooth communication channel linked thereto. That is, even when the electronic device 100 does not have a large amount of content, the electronic device 100 can acquire content from a device such as the mobile terminal 200 and output the content.

Figure 30:
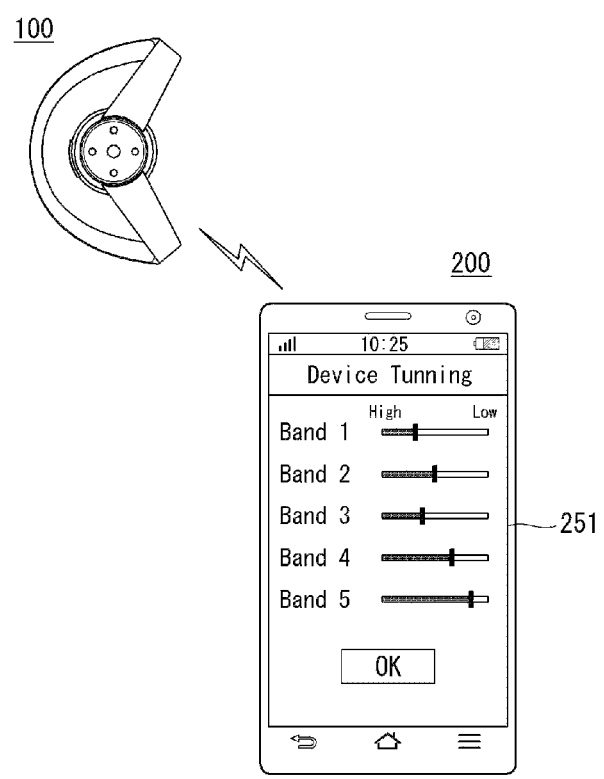

Referring to FIG. 30, the electronic device 100 can be controlled using the mobile terminal 200. For example, it is possible to tune the speaker of the electronic device 100 using the mobile terminal 200.

The electronic device 100 may have no display or may not display sufficient information since a display thereof is relatively small. Accordingly, the user can control the electronic device 100 more conveniently by using the mobile terminal 200 having a relatively large display.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
a body;
a plurality of supports each of which is coupled to the body through one side thereof; and
a deformable holder configured to connect other sides of the plurality of supports, the holder having a curved portion,
wherein the holder has a first radius with respect to an axis of the body,
wherein at least one of the plurality of supports rotates on the body and the rotation of the at least one of the plurality of supports, with respect to an axis of the body, causes the radius of the holder with respect to the axis of the body to either decrease to a second radius moving the holder towards the body or increase to a third radius moving the holder away from the body,
wherein when the radius of the holder is the second radius, the holder is deformed to correspond to a shape of the user's ear coming into contact with the holder, and
wherein the plurality of supports includes first and second supports, the first support is extended from the body in a first radial direction, the second support is extended from the body in a second radial direction different from the first radial direction.

2. The electronic device of claim 1, wherein the plurality of supports respectively have microphones for acquiring user voice.

3. The electronic device of claim 2, further comprising:
a controller configured to perform a noise cancelling operation on the basis of sound acquired through the microphone provided to the plurality of supports,
wherein the controller is configured to apply a noise cancelling operation control signal differently depending on a distance between the microphones according to rotation of the plurality of supports.

4. The electronic device of claim 1, wherein stoppers are provided to a region at one side of the at least one rotating support and a region of the body, corresponding to the region at one side of the at least one rotating support, so as to fix the at least one rotating support to a rotating position, the stoppers having shapes corresponding to each other.

5. The electronic device of claim 4, wherein the stoppers include a pattern formed in the region at one side and an elastic spring corresponding to the shape of the pattern.

6. The electronic device of claim 1, wherein a plurality of electronic devices is present, wherein one of the plurality of electronic devices transmits data to the other.

7. The electronic device of claim 6, wherein at least one of the plurality of electronic devices includes a controller, and
wherein the controller controls a first sound output through one of the electronic devices to differ from a second sound output through the other when the plurality of electronic devices operates in association with each other.

8. The electronic device of claim 1, further comprising:
a controller configured to activate the electronic device when at least one of rotation of at least one of the plurality of supports and movement of the electronic device is sensed.

9. The electronic device of claim 1, further comprising:
a controller configured to control the electronic device to perform different operations depending on distances between the electronic device and one or more other terminals.

10. A system, comprising:
an electronic device including a body, a plurality of supports, each of which is coupled to the body through one side thereof, and a deformable holder configured to connect other sides of the plurality of supports and having a curved portion,
wherein the holder has a first radius with respect to an axis of the body,
wherein at least one of the plurality of supports rotates on the body and the rotation of the at least one of the plurality of supports, with respect to an axis of the body, causes the radius of the holder with respect to the axis of the body to either decrease to a second radius moving the holder towards the body or increase to a third radius moving the holder away from the body, and
wherein when the radius of the holder is the second radius, the holder is deformed to correspond to a shape of the user's ear coming into contact with the holder; and
a terminal configured to operate in connection with the electronic device,
wherein at least one of the electronic device and the terminal transmits information to at least the other one of the electronic device and the terminal, depending on at least one of a status of the electronic device including current rotating angles of the plurality of supports, a status of the terminal depending on whether the terminal is connected to an external server, and a distance between the electronic device and the terminal, and
wherein the plurality of supports includes first and second supports, the first support is extended from the body in a first radial direction, the second support is extended from the body in a second radial direction different from the first radial direction.

11. The electronic device of claim 1, wherein the first support or the second support rotates on center of the body, and
wherein an angle between the first support and the second support in a first state, in which the electronic device hangs on the user's ear, is smaller than an angle between the first support and the second support in a second state, in which the electronic device is fastened to the user's ear.

12. The electronic device of claim 11, wherein the holder moves away from the body in the first state and the holder moves towards the body in the second state.

13. The electronic device of claim 11, wherein a distance between the center of the body and the holder in the first state is greater than a distance between the center of the body and the holder in the second state.

* * * * *